Oct. 30, 1951 P. M. FIELD 2,573,557
COPY STRIP RETAINING AND FEEDING MEANS FOR
OPTICAL PROJECTOR APPARATUS
Filed May 4, 1949 3 Sheets-Sheet 1
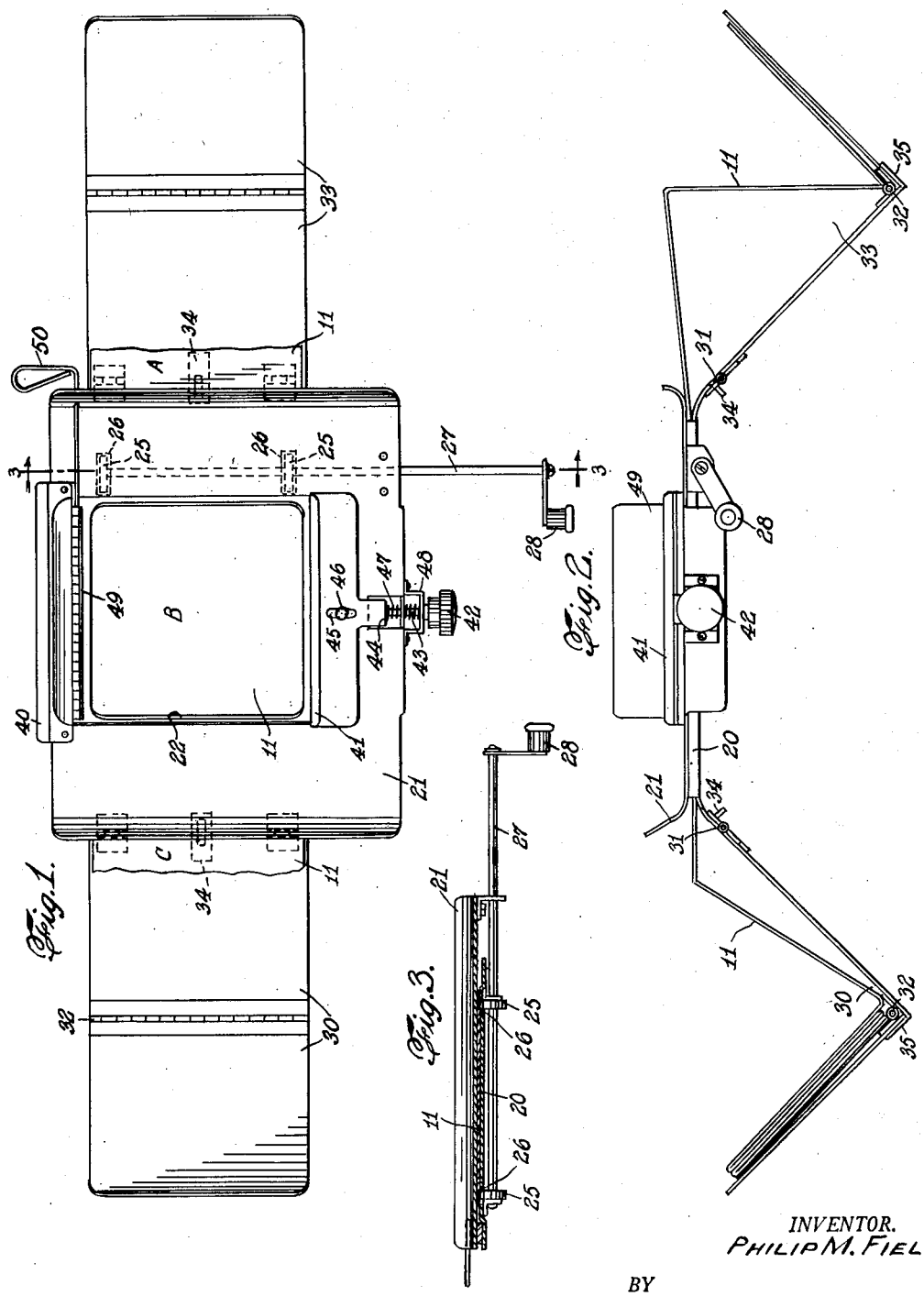
INVENTOR.
PHILIP M. FIELD
BY
ATTORNEY.

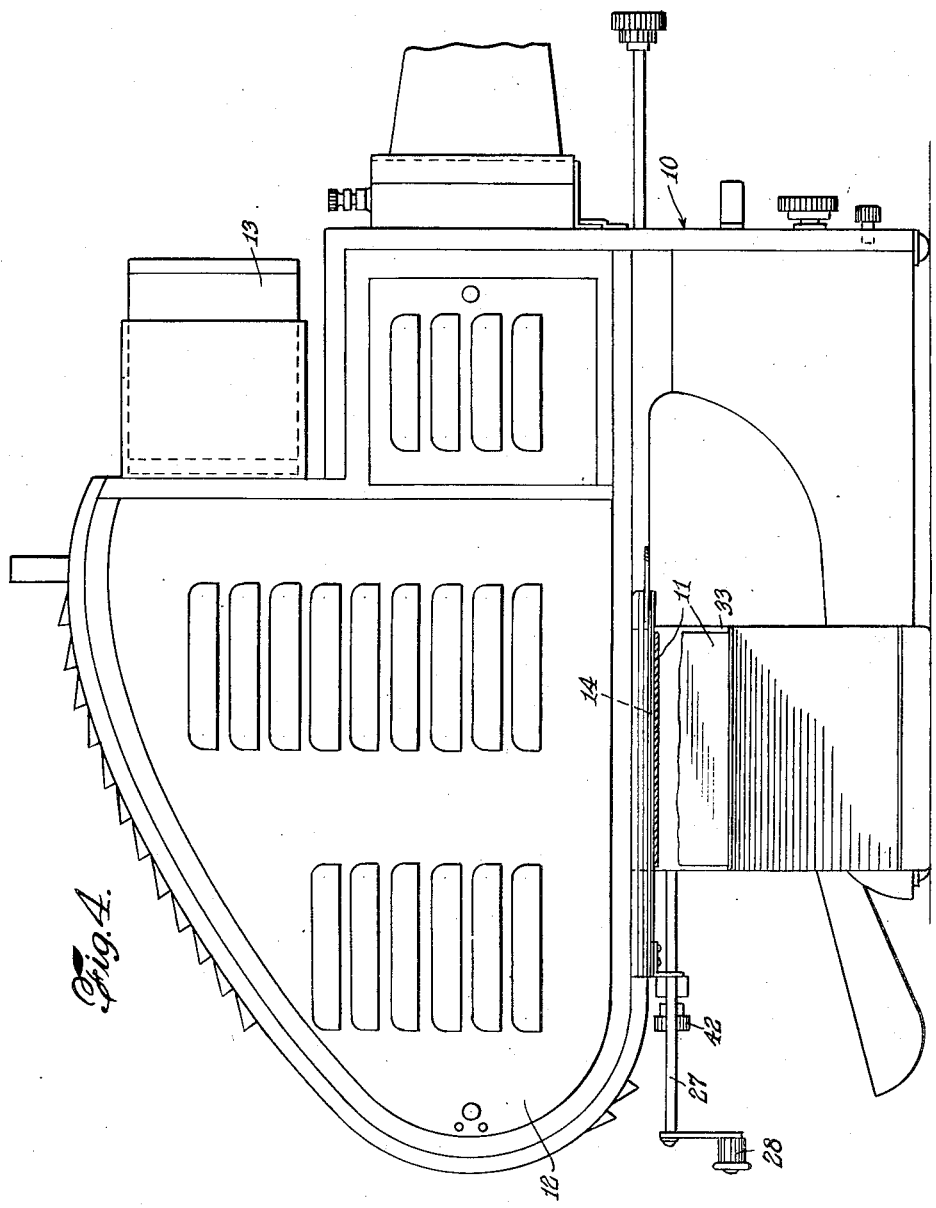

Oct. 30, 1951 P. M. FIELD 2,573,557
COPY STRIP RETAINING AND FEEDING MEANS FOR
OPTICAL PROJECTOR APPARATUS
Filed May 4, 1949 3 Sheets-Sheet 3

INVENTOR.
PHILIP M. FIELD
BY
Fred'k Schuetz
ATTORNEY.

Patented Oct. 30, 1951

2,573,557

UNITED STATES PATENT OFFICE 2,573,557

COPY STRIP RETAINING AND FEEDING MEANS FOR OPTICAL PROJECTOR APPARATUS

Philip M. Field, New York, N. Y., assignor to Charles Beseler Company, Newark, N. J., a partnership Application May 4, 1949, Serial No. 91,368

3 Claims. (Cl. 88—28)

The invention relates to projector apparatus designed more especially for the projection of copy of an opaque nature.

It has for an object to provide means whereby opaque copy in the form of a continuous strip of projectable matter may be passed intermittently or continuously over a field of projection for the display of said matter upon a suitable screen or the like.

A further object of the invention is to provide copy holder means admitting of the utilization of a strip having thereon the matter to be projected disposed longitudinally and continuously thereof or as panels or sections in an accordion-folded relationship along said strip.

A still further object of the invention is to provide a means to retain said strip temporarily in and to advance it through the field of projection of a suitable optical projector.

Another object of the invention is to provide a means for covering a portion of the projection area, said means being operable externally of the projector and during projection of the copy.

Another object of the invention is to provide advancing means for the strip which do not require unidirectional advancing elements, thus rendering possible retraction as well as advance of the copy strip.

Another object of the invention is to provide the strip retaining means with a pocket or receptacle from which said strip is to be fed forwardly and with a further pocket or receptacle to receive the same after projection.

Still another object of the invention is to provide a strip retaining and advancing means capable of unfolding an accordion-folded strip and refolding the same after it has been advanced through the projector.

The invention has for an object, also, to provide the strip retaining and feeding means with attaching means whereby it may readily be adapted to existing optical projector apparatus.

In carrying out the invention, the novel copy holder member is preferably in the nature of an attachment readily applicable to existing projector apparatus designed for the projection of opaque copy, although it may be embodied directly in such apparatus in the initial construction thereof. The copy itself may be provided on a strip either in the form of continuous matter or be divided into successive sections or panels of copy which then may be foldable. In accordance with the invention, an accordion folding action thereof in the latter instance is present in the advance of the copy strip; for example, as taken from a supply receptacle of generally V-shape over a platform and to a receptacle for receiving the exhibited sections and also of V-shape. A guide is provided to this end over the platform, the same affording an apertured frame for the copy or sections as presented in the projection field; and provision is made to cover variably a portion of this aperture. Suitable, and preferably adjustable, means associated, for example, with the apertured frame are provided whereby the holder may be adapted readily to existing projectors.

The nature of the invention, however, will best be understood when described in connection with the accompanying drawings, in which:

Fig. 1 is a plan view of an embodiment of the invention as a unit suitable for installation in standard projector apparatus.

Fig. 2 is a front elevation thereof.

Fig. 3 is a transverse section through the holder, taken on the line 3—3, Fig. 1 of the drawings, and looking in the direction of the arrows.

Fig. 4 is a side elevation of a projector apparatus illustrating the novel holder unit installed therein, a portion of the copy strip being broken away and also shown in vertical section.

Figure 5:
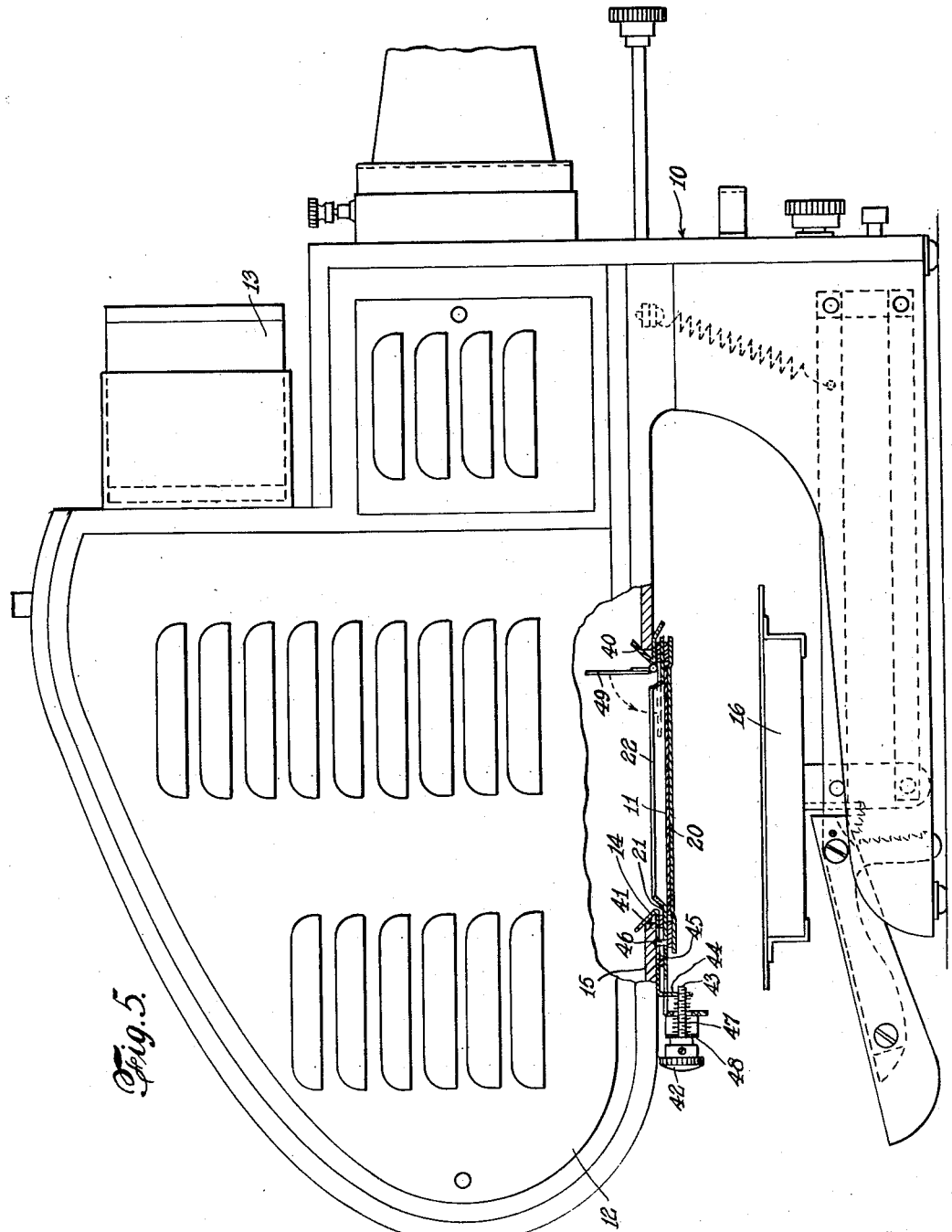
Fig. 5 is a similar elevation with a portion of the projection apparatus broken away and the installed holder member shown in vertical section.

Referring to the drawings, 10 designates a suitable projector apparatus of the type designed for the projection of opaque copy, in the present instance copy in the form of a continuous strip 11 embodying specifically a plurality of jointed sections formed, for example, by transversely creasing or weakening the strip to divide the same into a succession of panels with copy A, B, C, etc., on the upper faces. Such strip may therefore be accordion-folded as is shown more specifically in Fig. 2 of the drawings. This strip is designed to be advanced through the projector 10 which may be of the type, for example, more especially set forth in my prior U. S. Letters Patent No. 2,463,026, and embodying the lamp housing 12 and an opaque copy projector lens 13 for projecting copy to be located at the aperture 14 provided in the horizontal wall portion 15 of the projector. The copy holding member or tray 16 of the projector 10 will then not be made use of for the time being and is to be retained in the depressed location, as is more fully set forth in the aforesaid Letters Patent, to allow of introducing the novel strip projecting attachment.

As indicated, this is introduced from the rear of the projector below the wall portion 15 as is indicated more particularly in Figs. 4 and 5 of the drawings. The novel attachment or copy strip holder, reference being had to Figs. 1–3, inclusive, comprises a platform 20 bearing a superposed guide 21 displaced slightly from the platform surface and with an aperture portion or frame 22 further displaced and designed to register with the aperture 14 of the projector when the holder is installed in said projector. The copy strip 11 is designed to pass between the top of platform 20 and the guide 21, beneath the aperture 22, so that the subject matter of the successive sections of the strip may be registered with the apertures 14 and 22 for projection through lens 13, as is well understood. These sections are designed to be brought, in the embodiment shown, successively into the projection field or plane, for example, by means of manually operating a pair of friction rolls 25 designed to engage the undersurface of the strip in passing through respective openings 26 in the platform beyond the exit end of the aperture 22. This is effected conveniently by mounting the rolls 25 on an outwardly directed shaft 27 suspended from the holder and rotatable through the crank handle 28.

A supply of the copy strip 11 may conveniently be housed in a V-shaped open-ended receptacle 30 which is preferably hingedly supported along the edge 31 of the platform with its leaves as well hinged along the bottom 32; and the same arrangement is provided in connection with the receiving receptacle 33. Suitable slides 34 are provided at the top hinges to locate the corresponding receptacles 30 and 33 in their proper angular relationship to the platform, as well as fixed stops 35 at the bottom hinges to limit the extent of separation of the leaves of the said receptacles and to provide the angularity for proper unfolding and folding action of the strip in advancing the same through the holder.

By this expedient, the respective receptacles may conveniently be collapsed and then folded under the platform for ready transportation or for storage externally of the projector when the latter is to be used for other purposes.

In mounting the novel holder unit in the aperture 14 of the projector, provision is made for attaching means which may be contracted to admit the holding elements of the attachment upwardly through the bottom of the aperture 14. To this end, there is fixedly attached to the inner end of the guide 21 behind the aperture 22 therein an overhanging extension element 40 and at the outer end a similar extension element 41. The latter, however, is not rigidly attached to the guide but is slidable outwardly along the same to accommodate variations in the aperture 14 of the horizontal wall portion and to attach securely the holder unit thereto, both of these extensions being adapted to engage over the corresponding opposite edges of the said aperture, the one element 41 to this end being adjustable inwardly and outwardly through an adjusting screw with external knob 42 at the front of the attachment. This knob is designed to rotate a threaded stem 43 threadedly engaging the downturned portion of the bracket 44 having at its inner end the overhanging extension element 41. The bracket is provided also with a longitudinal slot 45 through which fits a guide and retaining pin 46 extending upwardly from the guide 21 to limit the relative motion between bracket 44 and the guide 21. A spring 47 coiled about the stem 43 bears at one end against the downturned portion of the bracket and a yoke 48 extending from the guide 21, thereby yieldingly urging the bracket inwardly and consequently its extension element 41. As the screw is loosened, the spring returns bracket 41 to the position proper for removing the device from the projector; and when it is tightened, the bracket 41 is drawn away from the fixed element 40, thus providing positive clamping on the edges of the aperture of the projector.

Immediately in front of the inner overhanging element there is hinged to the top of the guide and adjacent the aperture 22 a flap 49 manipulable through a handle 50 attached thereto and located externally of the projector, said flap being movable to various angular positions forwardly over the aperture 22 to obstruct a portion thereof, for example, in the event of narrower copy strip being advanced through the guide.

I claim:

1. A holder for strip opaque copy for use in projector apparatus, comprising a platform and means to support the same removably in the projection field of the apparatus and including elements respectively overhanging opposite sides of the platform to fit over corresponding edges of the projection field aperture, a guide, secured to the platform, for a continuous copy strip and affording an apertured frame portion for projection of the copy through the aperture, and friction means projecting through the platform against the guide to engage copy strip passing therebetween and advance the same to register with the apertured frame portion, together with means for operating manually said friction means.

2. The strip opaque copy holder according to claim 1, wherein substantially V-shaped receptacles for supplying and receiving copy strip respectively to and from the platform are hingedly connected to said platform at opposite ends thereof for folding under the platform, said copy strip consisting of a succession of sections foldable for accordion folding thereof in the respective receptacles, and slidable means are provided movable manually over the respective hinge portions to limit the downward swing of the receptacles, and the two members of each of the receptacles are hinged along the bottom, and the one member at the bottom is extended beyond and over the other member to limit their separation as a stop to afford predetermined angular separation of the members and the said other member being collapsible upon its associated member for folding said receptacles.

3. The strip opaque copy holder according to claim 1, wherein means are provided to adjust over the platform one of the overhanging elements with respect to the other to vary their separation.

PHILIP M. FIELD.

REFERENCES CITED

The following references are of record in the file of this patent:

UNITED STATES PATENTS

| Number | Name | Date |
|---|---|---|
| 1,072,861 | Koike | Sept. 9, 1913 |
| 1,357,983 | Hunt | Nov. 9, 1920 |
| 1,510,470 | Lany et al. | Oct. 7, 1924 |
| 1,553,906 | Marette | Sept. 15, 1925 |
| 1,767,847 | Howell | June 24, 1930 |
| 1,959,038 | Ridgway | May 15, 1934 |

FOREIGN PATENTS

| Number | Country | Date |
|---|---|---|
| 467,951 | Great Britain | June 25, 1937 |